UNITED STATES PATENT OFFICE.

HEINRICH BRANDENBURG, OF KEMPEN-ON-THE-RHINE, GERMANY.

PROCESS OF EXTRACTING TIN FROM TIN ORES.

No. 859,184.    Specification of Letters Patent.    Patented July 2, 1907.

Application filed October 25, 1906. Serial No. 340,448.

*To all whom it may concern:*

Be it known that I, HEINRICH BRANDENBURG, chemist, a subject of the King of Prussia, residing at 29 Moorenring, Kempen-on-the-Rhine, in the German Empire, have invented a new and useful Process for Extracting Tin from Tin Ores, Ashes, Waste Products, Residues, and other Tin-Containing Substances; and I do hereby declare the following to be a full, clear, and exact description of the same.

This invention relates to an improved process for extracting tin from tin ore, ashes, waste products, residues, and other tin-containing substances of any composition.

As is well known tin is obtained from tin-stone by a dry process, viz. by smelting it with coal. The reduction takes place at a high temperature, and the temperature of smelting is so high that slag is formed. The formation of slag in processes hitherto known is even intentional, in order to protect the tin reduced from tin ore, against oxidation by the air. It is well known that oxid of tin is distinguished by the property of being able to play the part of an acid as well as of a base, and consequently of easily passing into slag. It is chiefly the basic character of the oxid of tin which causes the formation of tin slag, the monoxid of tin becoming converted into silicate of tin with the silica of the charge or of the hearth. To that must be added the property of silicate of tin and of other slags, of dissolving dioxid and oxid of tin. The tin which has passed into the slag can only be extracted from the latter at considerable expense and with great difficulty.

This invention relates to a process intended to prevent the oxid or the dioxid of tin from passing into the slag, and this process is characterized by the reduction being effected at temperatures which preclude the possibility of the formation of any slags. The reducing process in such case takes place in such a manner that metallic raw or unrefined tin is obtained embedded in the loose, and not slagged, silica of the ore.

If the raw materials, that is to say, the ore or any other tin-containing substance, as well as the reducing substance, are thoroughly mixed together in the form of powder and heated in a furnace to a temperature precluding any possibility of the formation of slag, the product is obtained in which the reduced raw tin, containing as impurities chiefly iron, appears in the form of a powder. The monoxid of tin which was formerly accessible in the chemical sense, with difficulty has now been brought into a powdered form, that is to say, into a state in which the metal is in a very convenient form for any further chemical or electro-chemical treatment, and obviously it is necessary to take steps to prevent the re-oxidation of the reduced metal in view of the fact, that in in the form of powder, like most powdered metals, is easily liable to oxidation.

It is immaterial for the final result whether the reducing agent is solid, liquid or gaseous, and it goes without saying that the reduction could be preceded by a preparatory treatment, roasting, lixiviation and the like, according to the composition of the ore.

Having described my invention, what I claim as new, and desire to secure by Letters Patent of the United States is:—

1. A process for extracting tin from tin ore or other tin-containing substances by reduction which consists in heating it under reducing conditions at a temperature sufficient to reduce the tin to the metallic state but below that necessary for the formation of a slag, whereby the passage of the tin into slag is avoided.

2. A method of carrying out the process for extracting tin from tin ore and other tin-containing substances, which consists in mixing finely divided ore and a reducing agent together and subjecting them to a temperature sufficient to cause the reduction of the tin to a metallic state but below that necessary for the formation of slag, whereby the tin is obtained in the form of a powder and in a state suitable for mechanical, chemical or electrochemical treatment.

In witness whereof I have hereunto set my hand in the presence of two witnesses.

HEINRICH BRANDENBURG.

Witnesses:
AUGUST WAYLAND,
HEINRICH ZIMMERMANN.